United States Patent
Lee

(10) Patent No.: US 9,275,502 B2
(45) Date of Patent: Mar. 1, 2016

(54) DRIVING INFORMATION RESTORATION SYSTEM AND METHOD FOR VEHICLE

(71) Applicants: Hyundai Motor Company, Seoul (KR); Kia Motors Corporation, Seoul (KR)

(72) Inventor: Jin Young Lee, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/136,375

(22) Filed: Dec. 20, 2013

(65) Prior Publication Data

US 2015/0100202 A1   Apr. 9, 2015

(30) Foreign Application Priority Data

Oct. 7, 2013   (KR) .................. 10-2013-0118948

(51) Int. Cl.
*G07C 5/08* (2006.01)
*B60W 30/00* (2006.01)

(52) U.S. Cl.
CPC ............... *G07C 5/08* (2013.01); *B60W 30/00* (2013.01); *G07C 5/085* (2013.01)

(58) Field of Classification Search
CPC ...... F02D 41/22; G07C 5/008; G07C 5/0808; G07C 5/085; G07C 5/0858
USPC .......................................... 701/33.4; 709/219
See application file for complete search history.

(56) References Cited

U.S. PATENT DOCUMENTS

| | | | | | |
|---|---|---|---|---|---|
| 6,810,309 | B2 * | 10/2004 | Sadler | ..................... | B60R 25/04 701/1 |
| 7,103,460 | B1 * | 9/2006 | Breed | ................. | B60C 23/0408 701/29.1 |
| 8,058,982 | B2 * | 11/2011 | Crowe | ..................... | B60K 6/48 340/439 |
| 8,165,782 | B2 * | 4/2012 | Jeong | .................. | G07C 5/0825 123/480 |
| 9,043,073 | B2 * | 5/2015 | Ricci | ....................... | G06F 17/00 340/438 |
| 2003/0040854 | A1 * | 2/2003 | Rendahl | ............. | G01N 21/3504 701/31.4 |
| 2005/0216458 | A1 * | 9/2005 | Morris | .................... | B60K 35/00 |
| 2005/0273218 | A1 * | 12/2005 | Breed | ..................... | B60C 11/24 701/2 |
| 2005/0288833 | A1 * | 12/2005 | Motose | ................... | G01D 7/02 701/21 |

(Continued)

FOREIGN PATENT DOCUMENTS

| | | |
|---|---|---|
| JP | 10-109566 | 4/1998 |
| JP | 2004-137897 A | 5/2004 |

(Continued)

*Primary Examiner* — James Trammell
*Assistant Examiner* — Atul Trivedi
(74) *Attorney, Agent, or Firm* — Mintz Levin Cohn Ferris Glovsky and Popeo, P.C.; Peter F. Corless

(57) ABSTRACT

A driving information restoration system of a vehicle includes: a cluster configured to be operated in a receiving standby mode or transmit driving information stored therein to a diagnosis system depending on a comparison result of the driving information stored therein and driving information stored in controller, display hot key information received from the diagnosis system, transmit information input by a driver to the diagnosis system, and store the driving information received from the diagnosis system.

17 Claims, 1 Drawing Sheet

(56) References Cited

U.S. PATENT DOCUMENTS

| | | | |
|---|---|---|---|
| 2006/0149763 A1* | 7/2006 | Koyabu | G11B 27/034 |
| 2006/0190149 A1* | 8/2006 | LaPant | B60K 15/06 702/182 |
| 2007/0057781 A1* | 3/2007 | Breed | B60K 35/00 340/457.1 |
| 2007/0083327 A1* | 4/2007 | Brice | G06Q 10/00 701/410 |
| 2007/0093947 A1* | 4/2007 | Gould | G07C 5/008 701/31.5 |
| 2008/0103657 A1* | 5/2008 | Norton | G06Q 40/12 701/33.4 |
| 2008/0255755 A1* | 10/2008 | Chen | G01F 9/008 701/123 |
| 2009/0171529 A1* | 7/2009 | Hayatoma | B60K 35/00 701/36 |
| 2009/0254240 A1* | 10/2009 | Olsen, III | G06Q 10/06 701/29.5 |
| 2009/0312896 A1* | 12/2009 | Fernandez | B60L 1/00 701/22 |
| 2010/0057281 A1* | 3/2010 | Lawyer | G07C 5/0825 701/22 |
| 2010/0100306 A1* | 4/2010 | Gamache | F02N 11/0803 701/113 |
| 2010/0191404 A1* | 7/2010 | Ishikawa | B60K 35/00 701/31.4 |
| 2011/0046842 A1* | 2/2011 | Smith | G07C 5/006 701/31.4 |
| 2011/0112717 A1* | 5/2011 | Resner | G07C 5/008 701/31.4 |
| 2012/0065834 A1* | 3/2012 | Senart | G07C 5/008 701/31.4 |
| 2012/0185159 A1* | 7/2012 | Yamauchi | B66C 13/16 701/123 |
| 2013/0080022 A1* | 3/2013 | Mc Donald | F01M 11/12 701/102 |
| 2013/0090795 A1* | 4/2013 | Luke | H02J 7/00 701/22 |
| 2013/0090821 A1* | 4/2013 | Abboud | G07C 5/085 701/70 |
| 2013/0144482 A1* | 6/2013 | Tuukkanen | G01B 11/00 701/29.6 |

FOREIGN PATENT DOCUMENTS

| | | |
|---|---|---|
| JP | 2005-053397 A | 3/2005 |
| KR | 10-2005-0022928 A | 3/2005 |
| KR | 10-2006-0030222 | 4/2006 |
| KR | 10-2009-0029576 | 3/2009 |
| KR | 10-2010-0104660 | 9/2010 |

\* cited by examiner

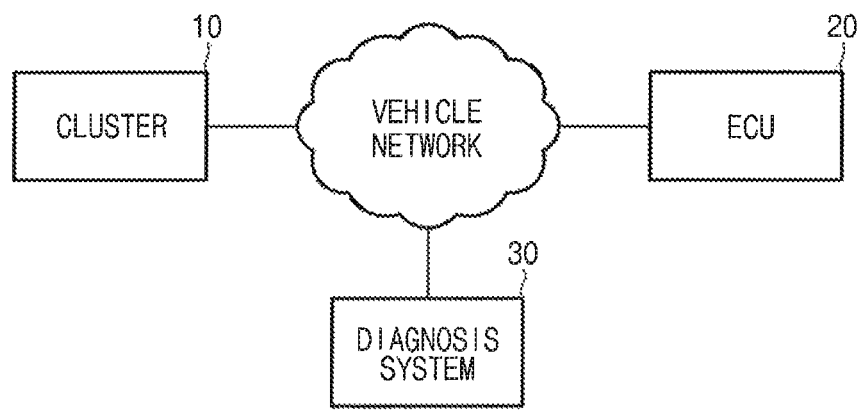

DRIVING INFORMATION RESTORATION SYSTEM AND METHOD FOR VEHICLE

CROSS-REFERENCE TO RELATED APPLICATION

This application is based on and claims priority from Korean Patent Application No. 10-2013-0118948, filed on Oct. 7, 2013 in the Korean Intellectual Property Office, the disclosure of which is incorporated herein in its entirety by reference.

BACKGROUND OF THE INVENTION

1. Field of the Invention

The present invention relates to a driving information restoration system of a vehicle, and more particularly, to a technology of restoring driving information stored in a cluster or an electronic control unit (ECU) by using an authorized diagnosis system at the time of replacing the cluster or the ECU of the vehicle.

2. Description of the Prior Art

Generally, a cluster which provides driving information and operation state information on various devices within a vehicle, such as an engine, to a driver is mounted in front of a driver's seat of the vehicle.

Often times, the cluster is provided with a plurality of gauges, such as a vehicle speed meter, a trip odometer, an odometer, an RPM speedometer indicating an engine RPM, a fuel gauge indicating a level of fuel, and a thermometer indicating a temperature of cooling water. In some instances, the cluster may also be provided with a brake warning light, a seat belt warning light, an anti-lock brake system (ABS) warning light, a traction control system (TCS) warning light, and an indicator indicating an operation state, a warning state, and the like, of other subsystems within the vehicle, and the like.

Recently, with the development of an automobile technology and the increase in various advanced safety devices, information which is to be indicated in the cluster in addition to the above-mentioned basic information has gradually increased. Further, with the increase in convenience equipment, such as various multimedia devices, information for operating the equipment for convenience and indicating the operation state thereof has increased accordingly.

For example, the information to be additionally indicated to the cluster may include fuel efficiency information, vehicle maintenance period information (oil exchange period, transmission oil exchange period, tire exchange period, and the like), driver setting information (seat position, steering wheel angle, cluster display language, and the like), and the like. Therefore, in order to increase display efficiency of various types of information, there is a need to mount a liquid crystal display (LCD).

When the cluster is replaced, all the stored driving information is lost, however, thus causing an inconvenience. Therefore, a need exists for a system and method of stably restoring the driving information without any operation.

SUMMARY OF THE INVENTION

Accordingly, the present invention has been made to solve the above-mentioned problems occurring in the prior art while advantages achieved by the prior art are maintained intact.

One subject to be achieved by the present invention is to provide a driving information restoration system of a vehicle restoring various types of driving information stored in a cluster or an ECU by using an authorized diagnosis system at the time of replacing the cluster or the ECU of the vehicle, thereby rapidly and accurately restoring the driving information while preventing a random operation of the driving information at the same time.

In one aspect of the present invention, there is provided a driving information restoration system of a vehicle including: a cluster configured to be operated in a receiving standby mode or transmit driving information stored therein to a diagnosis system depending on a comparison result of the driving information stored therein and driving information stored in an electronic control unit (ECU), display hot key information received from the diagnosis system, transmit information input by a driver to the diagnosis system, and store the driving information received from the diagnosis system, in which the ECU is configured to transmit the driving information stored therein to the diagnosis system upon determining that the cluster has been replaced by comparing the driving information stored therein to the driving information stored in the cluster. The diagnosis system is then configured to transmit hot key information to the cluster at the time of in receiving the driving information from the cluster or the ECU and transmit the driving information received from the ECU to the cluster at the time of receiving the same input information as the hot key information from the cluster.

BRIEF DESCRIPTION OF THE DRAWINGS

The above and other objects, features and advantages of the present invention will be more apparent from the following detailed description taken in conjunction with the accompanying drawings, in which:

FIG. 1 is a configuration diagram of a driving information restoration system of a vehicle according to an exemplary embodiment of the present invention.

DETAILED DESCRIPTION OF THE PREFERRED EMBODIMENTS

Hereinafter, exemplary embodiments of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations done or more of the associated listed items.

FIG. 1 is a configuration diagram of a driving information restoration system of a vehicle according to an exemplary embodiment of the present invention. As illustrated in FIG. 1, a driving information restoration system of a vehicle according to an exemplary embodiment of the present invention includes a cluster 10, an electronic control unit (ECU) 20 (i.e., a controller), and a diagnosis system 30, in which each of the components is connected via a vehicle network. In this case, the vehicle network includes a controller area network (CAN), a local interconnect network (LIN), a FlexRay, a media oriented system transport (MOST), or the like.

Describing each of the components, first, the cluster 10 may be any apparatus which displays driving information of a vehicle to help driving of a driver and includes a trip button (not illustrated) which selects a first trip distance display mode Trip A or a second trip distance display mode Trip B and a reset button not illustrated) which resets the first and second trip distances. Here, the driving information includes an integrated distance, fuel efficiency, an engine oil exchange period, and the like.

The cluster 10 transmits its own unique information (e.g., part number, software version, hardware version) to the ECU 20 and receives and stores the unique information of the ECU 20 from the ECU 20. That is, the cluster 10 and the ECU 20 share the unique information thereof.

Further, the cluster 10 transmits the driving information to the ECU 20 in real time and duplicates the driving information. That is, the ECU 20 is synchronized with the cluster 10 to receive and store the driving information which is displayed by the cluster 10. However, the cluster 10 terminates a duplication process when the driving information stored in the cluster 10 and the driving information stored in the ECU 20 are different from each other, that is, when the cluster 10 is a newly replaced cluster. Further, when the driving information stored in the cluster 10 and the driving information stored in the ECU 20 are the same, the duplication process is resumed.

When the cluster 10 periodically compares the driving information stored therein to the driving information stored in the ECU 20 to determine that the ECU 20 is replaced, the cluster 10 transmits the driving information stored therein to the diagnosis system 30. In this case, if it is determined that the cluster 10 itself is replaced, the cluster 10 is operated in a receiving standby mode which receives hot key information from the diagnosis system 30.

For example, when the driving information is an integrated distance, when an integrated distance k1 stored in the cluster 10 is less than an integrated distance k2 stored in the ECU 20 (k1<k2), the cluster 10 is operated in the receiving standby mode which receives the hot key information from the diagnosis system 30 and when the integrated distance k1 is greater than or equal to the integrated distance k2 (k1≥k2), determines that the ECU 20 is replaced to transmit the integrated distance stored in the cluster 10 to the diagnosis system 30. In this case, the hot key information may be, for example, "please press the trip button 10 times and then press the reset button 5 times, within 30 seconds'."

As another example, when the driving information is fuel efficiency, when fuel efficiency K3 stored in the cluster 10 is less than or equal to fuel efficiency k4 stored in the ECU 20 (k3≤k4), the cluster 10 determines that the ECU 20 is replaced to transmit the fuel efficiency stored in the cluster 10 to the diagnosis system 30 and when the fuel efficiency k3 is greater than the fuel efficiency k4 (k3>k4), the system is operated in the receiving standby mode which receives the hot key information from the diagnosis system 30. In this case, the hot key information may be for example, "please press the trip button 5 times and then press the reset button 2 times, within 10 seconds".

As another example, when the driving information is the engine oil exchange period, the driving information is the same as the case of the above-mentioned fuel efficiency. In this case, the hot key information may be, for example, "please press the trip button 1 times and then press the reset button 2 times longer (3 seconds or more), within 30 seconds."

Further, the cluster 10 may display the hot key information transmitted from the diagnosis system 30 in the receiving standby mode state and then allow a driver to transmit the information input through the trip button and the reset button to the diagnosis system 30. In this case, the cluster 10 receives and stores the driving information from the diagnosis system 30 when the input information transmitted from the diagnosis system 30 is the same as the hot key information. That is, the cluster restores the driving information.

Next, when the ECU 20 periodically compares the driving information stored therein to the driving information stored in the cluster 10 to determine that the cluster 10 whether the cluster has been replaced, the ECU 20 transmits the driving information stored therein to the diagnosis system 30.

For example, when the driving information is the integrated distance, when the integrated distance k1 stored in the ECU 20 is less than the integrated distance k2 stored in the cluster 10 (k1<k2), the ECU 20 shares the integrated distance stored in the cluster 10 and the unique information of the ECU 20 and the cluster 10 and when the integrated distance k1 is greater than or equal to the integrated distance k2 (k1≥k2), determines that the cluster 10 is replaced to transmit the integrated distance stored in the ECU 20 to the diagnosis system 30.

As another example, in the case in which the driving information is the fuel efficiency, when the fuel efficiency k3 stored in the ECU 20 is less than or equal to the fuel efficiency k4 stored in the cluster 10 (k3≤k4), the ECU 20 determines that the cluster 10 is replaced to transmit the fuel efficiency stored in the ECU 20 to the diagnosis system 30 and when the fuel efficiency k3 is greater than the fuel efficiency k4 (k3>k4), shares the fuel efficiency stored in the cluster 10 and the unique information of the ECU 20 and the cluster 10.

As another example, when the driving information is the engine oil exchange period, the driving information is the same as the case of the above-mentioned fuel efficiency. Next, when the diagnosis system 30 receives the driving information from the cluster 10 or the ECU 20, the diagnosis system 30 transmits the hot key information to the cluster 10.

Further, when the diagnosis system 30 receives the driving information from the ECU 20 and receives the same input information as the hot key information from the cluster 10, the diagnosis system 30 transmits the driving information received from the ECU 20 to the cluster 10. In this case, when the diagnosis system 30 receives the input information, which is not the same as the hot key information, from the cluster 10, the diagnosis system 30 does not transmit the driving information received from the ECU 20 to the cluster 10.

In the exemplary embodiment of the present invention, the ECU 20 refers to various types of controllers which communicate with the cluster 10.

Further, although the exemplary embodiments of the present invention describe only the case in which the cluster or the ECU of the vehicle is replaced, the exemplary embodiments of the present invention may be equally applied to the case in which the errors occur in the cluster or the ECU of the vehicle.

As set forth above, according to the exemplary embodiments of the present invention, the various types of driving information stored in the cluster or the ECU may be restored by using an authorized diagnosis system at the time of replacing the cluster or the ECU of the vehicle, thereby rapidly and accurately restoring the driving information while preventing the random operation of the driving information.

As described above, although the present invention has been described with reference to exemplary embodiments and the accompanying drawings, it would be appreciated by those skilled in the art that the present invention is not limited thereto but various modifications and alterations might be made without departing from the scope defined in the following claims.

What is claimed is:

1. A driving information restoration system of a vehicle, comprising:
    an controller configured to store driving information; and
    a cluster configured to be operated in a receiving standby mode or transmit driving information stored therein to a diagnosis system depending on a comparison result of the driving information stored therein and driving information stored in the controller, display hot key information received from the diagnosis system, transmit information input by a driver to the diagnosis system, and store the driving information received from the diagnosis system,
    wherein the controller is configured to transmit the driving information stored therein to the diagnosis system when the controller determines that the cluster has been replaced based on the comparison of the driving information stored therein to the driving information stored in the cluster; and
    the diagnosis system is configured to transmit hot key information to the cluster upon receiving the driving information from the cluster or the controller and transmit the driving information received from the controller to the cluster upon receiving a same input information as the hot key information from the cluster to restore the driving information to the cluster.

2. The driving information restoration system of a vehicle according to claim 1, wherein the driving information is any one of a group consisting of: an integrated distance, fuel efficiency, and an engine oil exchange period.

3. The driving information restoration system of a vehicle according to claim 2, wherein the driving information is an integrated distance, and when an integrated distance stored in the cluster is less than an integrated distance stored in the controller, the cluster is operated in a receiving standby mode which receives the hot key information from the diagnosis system and when the integrated distance stored in the cluster is greater than or equal to the integrated distance stored in the controller, determines that the controller is replaced to transmit the integrated distance stored therein to the diagnosis system.

4. The driving information restoration system of a vehicle according to claim 3, wherein when the integrated distance stored in the controller is less than the integrated distance stored in the cluster, the controller shares the integrated distance stored in the cluster and unique information of the controller and the cluster and when the integrated distance stored in the controller is greater than or equal to the integrated distance stored in the cluster, determines that the cluster is replaced to transmit the integrated distance stored therein to the diagnosis system.

5. The driving information restoration system of a vehicle according to claim 2, wherein the driving information is the fuel efficiency, and when the fuel efficiency stored in the cluster is less than or equal to fuel efficiency stored in the controller, the cluster determines that the controller has been replaced and transmits the fuel efficiency stored in the cluster to the diagnosis system, and when the fuel efficiency stored in the cluster is greater than the fuel efficiency stored in the controller, is operated in the receiving standby mode which receives the hot key information from the diagnosis system.

6. The driving information restoration system of a vehicle according to claim 5, wherein when the fuel efficiency stored in an electronic control unit (ECU) is smaller than or equal to fuel efficiency stored in the cluster, the controller determines that the cluster is replaced to transmit the fuel efficiency stored therein to the diagnosis system and when the fuel efficiency stored in the controller is larger than the fuel efficiency stored in the cluster, shares the fuel efficiency stored in the cluster and the unique information of the controller and the cluster.

7. The driving information restoration system of a vehicle according to claim 2, wherein the driving information is an engine oil exchange period, and when the engine oil exchange period stored in the cluster is less than or equal to engine oil exchange period stored in the controller, the cluster determines that the controller has been replaced and transmits the engine oil exchange period stored therein to the diagnosis system, and when the engine oil exchange period in the cluster is greater than the engine oil exchange period stored in the controller, the cluster is operated in the receiving standby mode which receives the hot key information from the diagnosis system.

8. The driving information restoration system of a vehicle according to claim 7, wherein when the engine oil exchange period stored in the controller is smaller than or equal to engine oil exchange period stored in the cluster, the controller determines that the cluster is replaced to transmit the engine oil exchange period stored therein to the diagnosis system and when the engine oil exchange period stored in the controller is larger than the engine oil exchange period stored in the cluster, shares the engine oil exchange period stored in the cluster and the unique information of the controller and the cluster.

9. A method, comprising:
    determining whether to operate a cluster in a vehicle in a receiving standby mode or transmit mode;
    determining that the cluster has been replaced by comparing driving information stored in the cluster to driving information stored on a diagnosis system;

in response to determining that the driving information is different on the controller than on the diagnosis system, transmitting and displaying hot key information from the diagnosis system;

in response receiving a same input information as the hot key information from the cluster, transmitting information input by a driver to the diagnosis system, and storing the driving information received from the diagnosis system to restore the driving information to the cluster.

10. The method of a vehicle according to claim 9, wherein the driving information is any one of a group consisting of: an integrated distance, fuel efficiency, and an engine oil exchange period.

11. The method of a vehicle according to claim 10 wherein the driving information is an integrated distance, and when an integrated distance stored in the cluster is less than an integrated distance stored in the controller, the cluster is operated in a receiving standby mode which receives the hot key information from the diagnosis system and when the integrated distance stored in the cluster is greater than or equal to the integrated distance stored in the controller, determines that the controller is replaced to transmit the integrated distance stored therein to the diagnosis system.

12. The driving information restoration system of a vehicle according to claim 11, wherein when the integrated distance stored in the controller is less than the integrated distance stored in the cluster, the controller shares the integrated distance stored in the cluster and unique information of the controller and the cluster and when the integrated distance stored in the controller is greater than or equal to the integrated distance stored in the cluster, determines that the cluster is replaced to transmit the integrated distance stored therein to the diagnosis system.

13. The driving information restoration system of a vehicle according to claim 10, wherein the driving information is the fuel efficiency, and when the fuel efficiency stored in the cluster is less than or equal to fuel efficiency stored in the controller, the cluster determines that the controller has been replaced and transmits the fuel efficiency stored in the cluster to the diagnosis system, and when the fuel efficiency stored in the cluster is greater than the fuel efficiency stored in the controller, is operated in the receiving standby mode which receives the hot key information from the diagnosis system.

14. The method of a vehicle according to claim 13, wherein when the fuel efficiency stored in an electronic control unit (ECU) is smaller than or equal to fuel efficiency stored in the cluster, the controller determines that the cluster is replaced to transmit the fuel efficiency stored therein to the diagnosis system and when the fuel efficiency stored in the controller is larger than the fuel efficiency stored in the cluster, shares the fuel efficiency stored in the cluster and the unique information of the controller and the cluster.

15. The method of a vehicle according to claim 10, wherein the driving information is an engine oil exchange period, and when the engine oil exchange period stored in the cluster is less than or equal to engine oil exchange period stored in the controller, the cluster determines that the controller has been replaced and transmits the engine oil exchange period stored therein to the diagnosis system, and when the engine oil exchange period in the cluster is greater than the engine oil exchange period stored in the controller, the cluster is operated in the receiving standby mode which receives the hot key information from the diagnosis system.

16. The method according to claim 15, wherein when the engine oil exchange period stored in the controller is smaller than or equal to engine oil exchange period stored in the cluster, the controller determines that the cluster is replaced to transmit the engine oil exchange period stored therein to the diagnosis system and when the engine oil exchange period stored in the controller is larger than the engine oil exchange period stored in the cluster, shares the engine oil exchange period stored in the cluster and the unique information of the controller and the cluster.

17. A non-transitory computer readable medium containing program instructions executed by a processor within a controller, the computer readable medium comprising:

program instructions that determine whether to operate a cluster in a vehicle in a receiving standby mode or transmit mode;

program instructions that determine that the cluster has been replaced by comparing driving information stored in the cluster to driving information stored on a diagnosis system;

program instructions that, in response to determining that the driving information is different on the controller than on the diagnosis system, transmit and display hot key information from the diagnosis system;

program instructions that, in response receiving a same input information as the hot key information from the cluster, transmits information input by a driver to the diagnosis system, and stores the driving information received from the diagnosis system to restore the driving information to the cluster.

* * * * *